United States Patent Office 3,119,740
Patented Jan. 28, 1964

3,119,740
PROCESS FOR PREPARING PURIFIED FOLLICLE STIMULATING HORMONE
Sanford L. Steelman, Westfield, N.J., and Thomas L. Kelly, Terre Haute, Ind., assignors, by mesne assignments, to Armour-Pharmaceutical Company, a corporation of Delaware
No Drawing. Filed Apr. 13, 1959, Ser. No. 805,727
6 Claims. (Cl. 167—74)

This invention relates to the follicle stimulating hormone of the anterior pituitary gland, and more particularly to a follicle stimulating hormone (FSH) free from contaminant physiological factors and to a method of preparing same.

This patent application is in part a continuation of our co-pending patent application Serial No. 595,827 filed July 5, 1956, now abandoned.

The preparation of an "apparently homogeneous" FSH was reported in the literature as early as 1949, Fruton and Simmonds, General Biochemistry, John Wiley & Sons, Inc., New York, New York (1953). In Endocrinology, 56, 216-217 (1955), S. L. Steelman et al. have described the isolation of an FSH product having a potency in the order of 8 or 9 times that of the aforementioned apparently homogeneous preparation.

It is an object of this invention to provide an FSH preparation which demonstrates not only significantly greater biological potency than the product described by Fruton and Simmonds, but which is of a purity distinct even from that disclosed in the Steelman et al. article. Another object is to provide an FSH preparation which is substantially non-antigenic upon parenteral administration at a physiologically active dosage level. A further object is to provide a process for preparing this unique FSH product which is especially adaptable to large scale manufacture.

The FSH preparation of this invention is distinct from products disclosed in the prior art with reference to the molecular weight, cystine content, FSH potency, and carbohydrate content thereof, and especially by reference to the hexose and hexosamine content thereof.

The advantages of this invention can be achieved with an FSH product having a molecular weight of less than 50,000, although better results are obtained with an FSH product having a molecular weight of less than 35,000, and especially significant in therapeutic application is the FSH disclosed herein having a molecular weight of about 30,000.

The carbohydrate content of this FSH product is at least 3% by weight, although better results may be obtained with a product having a carbohydrate content of at least 5% by weight, and the salient therapeutic preparations comprehended by this invention have a carbohydrate content of about 7 to 8% by weight. The prominent detectable carbohydrates contained in this FSH product are mannose, galactose and fucose; the latter sugar not having been previously reported as a constituent of FSH. The hexose content of this FSH product should be at least 2%, while better results are achieved with an FSH product containing at least 3% by weight of hexose, and the special advantages of this invention can be achieved with an FSH product containing about 4% by weight of hexose. Also, the hexosamine content of this FSH product is at least 1% by weight, while better results may be obtained with an FSH product containing at least 2.5% by weight of hexosamine, and especially desirable therapeusis may be achieved with an FSH product containing about 4% by weight of hexosamine.

The advantages of this invention may be achieved with an FSH product containing at least 4.5% by weight of cystine, although better results may be obtained with an FSH product containing at least 5.5% by weight of cystine, and significant therapeusis in accordance with this invention can be achieved with an FSH product containing about 6 to 7% by weight of cystine.

The biological activity of this FSH product can be determined according to the augmentation method of Steelman and Pohley, Endocrinology, 53, 604–616 (1953). The analytical results of this procedure may be expressed as a multiple of the FSH Standard (264–151X) described in the Steelman and Pohley article, and for the purposes of this invention the FSH Standard is referred to as the "Standard."

The FSH product of this invention can be characterized biologically as demonstrating a potency of at least 1350% of that of the aforementioned Standard. However, better results are obtained with a product having an FSH potency of at least 1600 to 1800% of that of the Standard, and especially desirable therapeusis can be achieved with a preparation having an FSH potency of at least 3000% of that of the Standard. Preparations in accordance with this invention have been prepared with FSH potencies in the range of 3500 to 5000% of that of the Standard. It has been found that at a dose of this FSH preparation of 0.001–0.0025 mg. there will be obtained a significant increase in the ovarian weight of immature hypophysectomized female rats. Also, analyses for luteinizing hormone activity, involving immature hypophysectomized male rats, have demonstrated that this FSH preparation, in a dose of 0.5 mg., does not significantly increase the weight of the ventral prostate of the animals, and there is not provided any androgenic morphologic changes in the animals. Further, tests for TSH, ACTH and STH at the dosage level employed for analyzing the content of luteinizing hormone in this FSH preparation, were negative.

This FSH product can be prepared by a method involving a special ion exchange fractionation procedure, which can be obtained in either a batch or column operation. In accordance with this method, a solution of an FSH-containing material is contacted with a cellulose anion exchanger at a pH alkaline to the isoelectric point of FSH and a molarity of not more than 0.1 to adsorb the FSH on such anion exchanger. By cellulose anion exchanger is meant cellulose having anionic exchange groups bonded to the cellulose molecule. Examples of suitable cellulose anion exchangers are diethylaminoethyl cellulose, dimethylaminoethyl cellulose and quaternary ammonium ethers of cellulose described in the co-pending patent application of M. A. Mitz, Serial No. 559,138, filed January 16, 1956, now abandoned.

The isoelectric point of FSH is approximately pH 5.0–5.2 and consequently the aforementioned adsorption step should be obtained at a pH of at least about 5.0–5.5. Better adsorption of the FSH on the cellulose anion exchanger is obtained at a pH of from 6.0 to 8.5 and a molarity of less than 0.02. Especially desirable results are achieved when the FSH-containing material is contacted with the cellulose anion exchanger at an approximately neutral pH, i.e., about 7.0. Significant selective adsorption of FSH on the cellulose anion exchanger may be obtained at a molarity of about 0.005.

In carrying out this adsorption procedure the cellulose anion exchanger may be equilibrated to the aforementioned conditions by treatment with an aqueous solution having the desired pH and molarity. The equilibrated cellulose anion exchanger can be separated from residual liquid and packed into a vertically-positioned column. The solution of FSH-containing material, also adjusted to the desired pH and molarity, can then be passed downwardly through the column of cellulose anion exchanger.

The effluent recovered from the bottom of the column may be discarded or employed in the preparation of other physiologically active pituitary factors.

The FSH adsorbed on a cellulose anion exchanger as hereinbefore described can be selectively separated from contaminant substance by a special elution procedure. This elution may be obtained by treating the adsorbate of FSH on a cellulose anion exchanger with an aqueous solution at a pH acid to the isoelectric point of FSH, i.e., a pH of less than about 4.8. The selective elution of FSH may be achieved at a pH acid to the isoelectric point of FSH without the need for special adjustment of the molarity of the system. Since at a pH of less than 3.5, FSH activity is susceptible to destruction and the capacity of the cellulose anion exchanger is materially reduced, it is desirable during this desorption step to maintain in the system a pH of from approximately 3.5 to 4.8.

The selectivity of this elution procedure has been found to be enhanced at a pH alkaline to the isolelectric point of FSH and at a critical molarity in the system. The pH during the desorption step may be the same as that hereinbefore described in connection with the adsorption step, i.e., a pH alkaline to the isoelectric point (isoionic range) of FSH. Thus, the pH of desorption in this special process should be at least about 5.0 to 5.5, and preferably at a pH of from 6.0 to 8.5. When elution of the FSH is obtained at a pH alkaline to the isolelectric point of FSH, there should be employed a molarity of at least 0.01. Further, when the pH of the system during desorption is from 6.0 to 8.5, better results are achieved at a molarity of about 0.075. The advantages of this invention can be achieved by eluting the FSH adsorbed on the cellulose anion exchanger at a molarity of at least 0.01. When the pH of the system during desorption is from 6.0 to 8.5, better results are obtained at a molarity of about 0.075. In practical commercial operations the molarity of the system during desorption may be in the range of 0.1 to 0.2, although a greater molarity has been found not to significantly effect the selective elution of FSH.

The salts employed in achieving the critical molarity of the adsorption and desorption systems in this fractionation should not be inherently deleterious to the FSH molecule or to the physiological activity thereof, but withstanding this consideration, any salt may be utilized in this process. For example, salts suitable for utilization in this process are potassium chloride, sodium chloride, sodium phosphate, sodium hypophosphate, sodium hyperphosphate, and the corresponding potassium phosphate compounds.

This elution step may be carried out by passing an aqueous solution having the desired pH and molarity downwardly through a packed column of the FSH adsorbed on the cellulose anion exchanger. The eluate containing the selectively desorbed FSH can be collected at the bottom of the column, and the collected eluate may be dehydrated by lyophilization, treated to further purification, or packaged directly for pharmaceutical purposes.

The starting material for this fractionation procedure may be any FSH-containing material. Thus, the starting material may be a suitable aqueous extract of pituitary tissue or of anterior pituitary tissue. The tissue source may be pituitary glands obtained from animals such as hogs, cattle, sheep, etc. However, an especially desirable FSH product can be prepared in accordance with this invention from comminuted hog pituitary tissue. In commerical operations, this purification procedure may be effectively carried out employing an aqueous extract of the tissue residues resulting from extraction of ACTH from pituitary glands in an acid-acetone system according to the process set forth in U.S. Patent No. 2,799,621.

Preparatory to this adsorption-elution procedure, it is desirable to pretreat an aqueous solution of the FSH-containing material, such as the aforementioned extract of ACTH residues, to an alcohol fractionation. In this pretreatment a monohydroxy alkane containing less than 4 carbon atoms, i.e., ethanol, methanol and propanol, is added to such aqueous solution to a final alcohol concentration of at least 50% by volume to precipitate an FSH-containing fraction, and such precipitate is separated from the supernatant liquid. This separated precipitate can be suspended in water at the desired pH and molarity and employed as a starting material in the adsorption-elution procedure of this invention. The pH of the alcohol-water mixture in this fractionation scheme should be from about 7.0 to 10, and especially desirable results are achieved at a pH of from about 8.0 to 9.0. Especially desirable alcohol fractionation is achieved at a pH of about 8.6 and an alcohol concentration of about 70% by volume. The temperature during this alcohol fractionation should be somewhat less than 25° C. to prevent thermal destruction of the FSH activity. It will be understood that under conditions of relatively greater acidity precipitation of FSH may be obtained at a lower alcohol concentration, or, a suitable zinc salt may be added thereto at an even lower alcohol concentration.

Also, the FSH-containing material can be subjected to proteolysis prior to fractionation in this adsorption-elution procedure, and, to achieve especially desirable results the proteolysis may be followed by the aforementioned alcohol fractionation, and thereafter by treatment with the cellulose anion exchanger. In this proteolysis the FSH-containing material, e.g., an aqueous extract of the aforesaid tissues resulting from ACTH extraction, can be treated with proteinases such as trypsin and chymotrypsin at a pH and temperature at which the proteolytic action of such enzymes is maximal to render the FSH more readily separable from contaminant proteins. Better results are achieved by proteolysis with pancreatin, i.e., defatted, dehydrated comminuted hog pancreas tissue, at a pH of from about 6.5 to 10.0. Especially desirable proteolysis can be obtained with pancreatin at a pH of about 8 to 9.

In carrying out this proteolysis, pancreatin triple-strength (N.F. potency 1:75) may be mixed with the FSH-containing material at an enzyme-substrate ratio of approximately 1:90. This proteolysis may be obtained in accordance with well-known concepts of enzymatic action, at an elevated temperature, i.e., above about 25° C., in a shortened period of time, and under the aforesaid conditions complete proteolysis can be achieved at a temperature of approximately 37° C. in a period of about 3 hours.

After proteolysis has been completed the resulting proteolysate may be subjected to the aforesaid alcohol fractionation procedure, or employed directly in the adsorption-elution method of this invention, or, if desired, the proteolysate may be dialysed against water to separate end products of enzyme digestion from FSH-containing material.

This invention can be illustrated by the following specific examples:

*Example I*

Diethylaminoethyl cellulose was equilibrated by treatment with a pH 7.0, 0.005 M sodium phosphate buffer solution. The equilibrated cellulose anion exchanger was packed in a vertically-positioned column to a height of 40–50 cm.

Swine FSH, in the amount of 400 mg., prepared by the aforementioned proteolysis procedure and pretreated to the previously described alcohol fractionation, having a potency of 800% of that of the Standard, was dissolved in 10 ml. of distilled water. The resulting solution was adjusted to pH 7.0.

This FSH solution was passed downwardly through the cellulose anion exchanger column. The effluent was discarded.

The cellulose exchanger column was washed with 30 ml. of pH 7.0, 0.005 M sodium phosphate buffer solution. Elution of the washed column was obtained with an aqueous solution containing 0.5 M sodium chloride and 0.1 M disodium phosphate passed through a 200 ml. reservoir of distilled water.

The first 12 ml. of eluate thereby obtained was discarded. Thereafter eluate fractions in the amount of 3 ml. were collected. Each of the collected fractions was subjected to spectrophotometric analysis to determine ultraviolet absorption at a wave length of 280 m$\mu$ as a measure of optical density. The protein concentration of such fractions was calculated by multiplying the volume of the fraction, taking into consideration an appropriate dilution factor, with the optical density thereof. This protein concentration can be expressed in terms of "optical density units."

The 400 mg. of FSH-containing starting material represented a total of 537 optical density units according to the value obtained with an aliquot from such starting material.

Fractions 1 to 16 and 17 to 42 were pooled separately, and by biological determination of ovarian weight increase in immature intact female rats according to the aforementioned analytical method, it was found that the activity of pooled fractions 17 to 42 demonstrated about a three-fold increase in potency over the starting material, i.e., about 2500% of the Standard.

*Example II*

Another 400 mg. of the FSH-containing starting material described in Example I was treated in the same manner as set forth in Example I, and a comparable pool of fractions 17 to 42 was collected and combined with pooled fractions 17 to 42 from the batch described in Example I.

The combined fractions were dialysed against distilled water, lyophilized, and then re-dissolved in 10 ml. of distilled water. Analysis demonstrated that the resulting solution contained 283 optical density units or about one-fourth of the protein content of 800 mg. in the starting material.

This solution was adjusted to pH 7.0 and the adjusted solution was again passed through the cellulose anion exchanger column. The effluent was discarded, and the resulting adsorbate was washed with 30 ml. of pH 7.0, 0.005 M sodium phosphate buffer solution.

The washed adsorbate was eluted with a solution containing 0.25 M sodium chloride and 0.05 M disodium phosphate passed through a 200 ml. reservoir of distilled water. Again, 3.0 ml. fractions were collected, and the optical density of such fractions was determined.

The analytical results indicated that fractions 33 to 42 and fractions 43 to 60 contained the major portion of the FSH activity and that these two components of the starting material were probably identical.

*Example III*

Fractions 33 to 42 and 43 to 60 from Example II were pooled and dissolved in 10 ml. of water. The resulting solution, which contained a total of 90 optical density units, was adjusted to pH 7.

The adjusted solution was passed through a column containing 10 ml. of equilibrated diethylaminoethyl cellulose in a height of 40 cm. The effluent was discarded, and the resulting adsorbate was washed with 10 ml. of pH 7.0, 0.005 M sodium phosphate buffer solution.

The washed adsorbate was eluted with a solution containing 0.5 M sodium chloride and 0.1 M disodium phosphate passed through a 200 ml. reservoir of distilled water. The eluate was collected in 1.0 ml. fractions.

The combined eluate demonstrated a single, sharp peak on chromatographic analysis. The pooled fractions were dialyzed and lyophilized. The dried product was obtained in a yield of 96 mg.

This product is analyzed in hypophysectomized immature female rats in accordance with the aforementioned procedure to determine the minimal dose required to obtain an ovarian response as well as to determine the presence of contaminant physiological factors. The results indicated that a significant increase in ovarian weight was obtained with a dose of 0.001–0.0025 mg. of the product. No histological effects were observed in the thyroid or adrenal glands with a dose as high as 0.5 mg. Analysis in hypophysectomized male rats at a dose of 0.5 mg. demonstrated no leutinizing hormone activity as measured by the increase in the weight of the ventral prostrate gland. The testicular weights were maximal for FSH.

Electrophoretic analysis at several pH levels between 4.0 and 9.5 demonstrated a single component. Ultracentrifugal studies indicated homogeneity with an approximate molecular weight of 29,000, a sedimentation constant ($S_{20w}$) of 2.49 and a diffusion constant ($D_{20w}$) of $7.3 \times 10^{-7}$.

This FSH preparation was subjected to amino acid analysis, and the results were as follows.

| Amino acid: | Content (percent by weight) |
|---|---|
| Aspartic acid | 11.6 |
| Glutamic acid | 9.2 |
| Serine | 4.4 |
| Glycine | 2.9 |
| Threonine | 5.4 |
| Alanine | 3.5 |
| Lysine | 5.7 |
| Arginine | 3.6 |
| Proline | 4.4 |
| Tyrosine | 4.5 |
| Valine | 3.9 |
| Methionine | 1.5 |
| Isoleucine | 2.8 |
| Leucine | 4.0 |
| Phenylalanine | 3.3 |
| Histidine | 2.8 |
| Cystine | 6.5 |
| Tryptophan | 0.7 |

The hexose content of this FSH preparation was found to be 3.7% by weight, which was represented by 1.2% by weight of galactose, 1.4% by weight of mannose and 1.1% by weight of fucose. The accuracy of the individual carbohydrate analyses was ±10%. The hexosamine content of this FSH preparation was determined as 3.7% by weight with a potential analytical error of ±15–20%.

*Example IV*

The following process was employed in preparing the FSH product of this invention employing as a starting material sheep gonadotropin.

A purified commercial sheep gonadotropin product prepared by the method of V. Koenig and E. King, Arch. Biochem.; 26, 219 (1950), in the amount of 10 g., was combined with 500 ml. of a 0.5 saturated ammonium sulfate solution. The resulting mixture was extracted by being held overnight at a temperature of 5° C. Then, the mixture was centrifuged, and the separated supernatant liquid was saturated with solid ammonium sulfate. The precipitate thereupon formed was separated from the supernatant liquid by filtration, and subjected to dialysis. The dialyzed material was lyophilized to yield 2.8 g. of dry product.

The dry product, in the amount of 1 g., was dissolved in 40 ml. of a 0.005 M sodium phosphate buffer solution having a pH of 7.0. The resulting solution was introduced into a column of DEAE-cellulose equilibrated with a 0.005 M sodium phosphate buffer solution having a pH of 7.0. This ion exchange column had dimensions of 1.2 x 60 cm., and there was contained in the column 0.5 meq./gm. of the DEAE-cellulose.

The unadsorbed solution was collected at the bottom of the column in fractions of 3 ml. each, and the optical density of each fraction was determined at a wave length of 280 mμ. Then, the ion exchange column was washed with 1 column volume of the buffer solution.

Thereafter, a gradient elution was obtained employing a 0.15 M sodium chloride-0.03 M disodium phosphate passed through a reservoir of 200 ml. of the 0.05 M sodium phosphate buffer solution. Again, the eluate was collected in fraction of 3 ml. each, and the optical density of each fraction was determined at a wave length of 280 mμ.

Fractions 59 to 80 were found to contain most of the FSH biological activity, and such fractions accounted for 10–12% of the total optical density recovered. The biological analysis thereof indicated an FSH activity approximately 20–25 times that of the Armour Standard (264–15X).

This composite preparation was dialyzed and lyophilized. The lyophilized product was again subjected to ion exchange treatment employing a column of ion exchanger having dimensions of 1 x 40 cm., and the conditions utilized were the same as described above. The eluate was again collected in fractions of 3 ml. each. The fractions were pooled, as follows: Fractions 1 to 19 were contained in pool I, fractions 20 to 26 were contained in pool II, fractions 27 to 40 were contained in pool III, fractions 41 to 50 were contained in pool IV, and fractions 51 to 85 were contained in pool V. Analysis for FSH activity of these pools indicated that pool II had a potency of less than 10 times that of the Armour Standard, pool III had a potency of about 10 times that of the Armour Standard, pool IV had a potency of greater than 30 times that of the Armour Standard, and pool V had a potency of less than 10 times that of the Armour Standard.

Accordingly, it will be seen that pool IV was the only product demonstrating high biological activity, and that the FSH potency thereof was greater than 30 times that of the Armour Standard.

While in the foregoing specifications various embodiments of this invention have been set forth and specific details thereof elaborated for the purpose of illustration, it will be apparent to those skilled in the art that this invention is susceptible to other embodiments and that many of these details can be varied widely without departing from the spirit and concept of the invention.

We claim:

1. In a process for preparing a pituitary follicle stimulating hormone preparation suitable for parenteral administration, the steps of contacting a solution of FSH-containing material with cellulose containing anion exchange groups at a pH alkaline to the isoelectric point of FSH and a molarity of less than 0.1 to adsorb the FSH on said anion exchanger, and contacting the resulting adsorbate with an aqueous solution having a pH alkaline to the isoelectric point of FSH and a molarity of at least 0.1 to selectively elute the adsorbed FSH.

2. In a process for preparing a follicle stimulating hormone preparation suitable for parenteral administration, the steps of contacting a solution of FSH-containing material with cellulose containing anion exchange groups at a pH of at least about 5.0 to 5.5 and a molarity of less than 0.1 to adsorb the FSH on said anion exchanger, and contacting the resulting adsorbate with an aqueous solution having a pH acid to the isoelectric point of FSH to selectively elute the adsorbed FSH.

3. In a process for preparing a follicle stimulating hormone preparation suitable for parenteral administration, the steps of contacting a solution of FSH-containing material with cellulose containing anion exchange groups at a pH of from 6.0 to 8.5 and a molarity of less than 0.02 to adsorb the FSH on said cellulose, and contacting the resulting adsorbate with an equeous solution at a pH of from about 3.5 to 4.8 to selectively elute the adsorbed ACTH.

4. In a process for preparing a follicle stimulating hormone preparation suitable for parenteral administration, the steps of contacting a solution of FSH-containing material with cellulose containing anion exchange groups at a pH of from 6.0 to 8.5 and a molarity of less than 0.02 to adsorb the FSH on said cellulose, and contacting the resulting adsorbate with an aqueous solution at a pH of from 6.0 to 8.5 and a molarity of about 0.075 to selectively elute the adsorbed FSH.

5. The process of claim 4 in which said cellulose containing anion exchange groups is dimethylaminoethyl cellulose.

6. The process of claim 4 in which said cellulose containing anion exchange groups is diethylaminoethyl cellulose.

References Cited in the file of this patent

UNITED STATES PATENTS 2,759,787　　Touey ------------------ Aug. 21, 1956

OTHER REFERENCES

Guthrie: Industrial and Engineering Chem., vol. 44, No. 9, September 1952, pp. 2187–2189.

McShan: Proc. Soc. Exptl. Biol. and Med., vol. 85, No. 3, March 1954, pp. 393–398.

McShan: Proc. Soc. Exptl. Biol. and Med., vol. 88, No. 2, February 1955, pp. 278 and 283.

West and Todd: "Textbook of Biochemistry," 1955, pp. 1265 and 1293.